July 14, 1936. W. STELKENS 2,047,395
FILM EXTRUDING PRESS
Filed Sept. 16, 1933
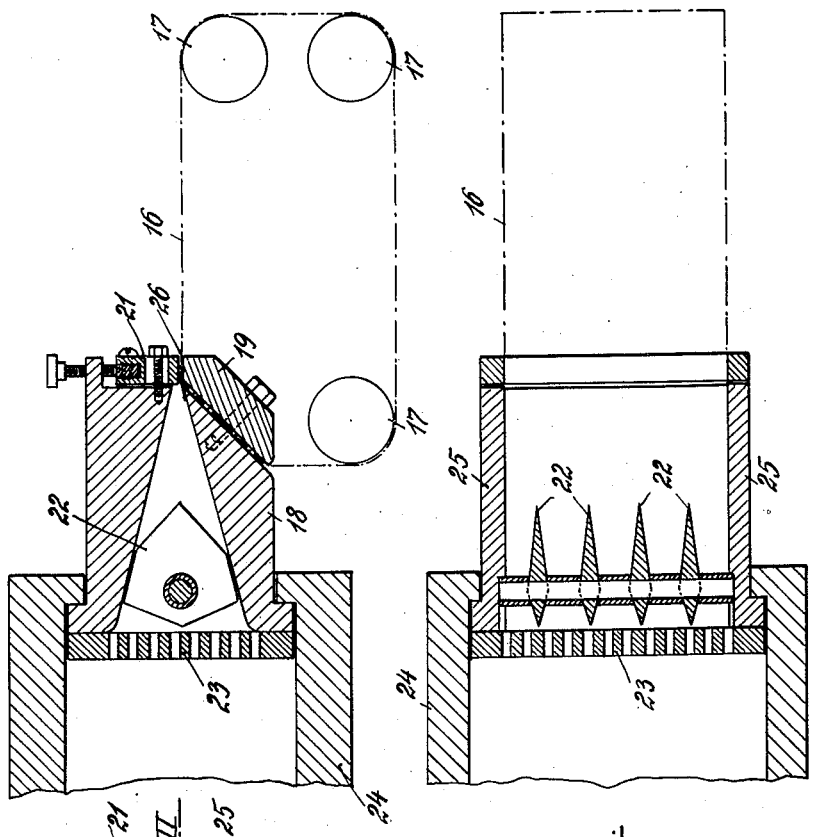
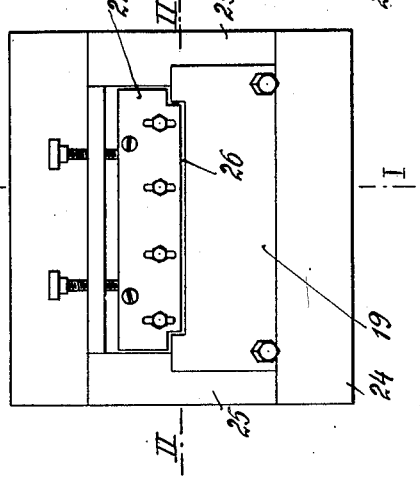
Inventor:
Willy Stelkens
by Kunihardt
Atty.

Patented July 14, 1936

2,047,395

UNITED STATES PATENT OFFICE 2,047,395

FILM EXTRUDING PRESS

Willy Stelkens, Cologne, Germany

Application September 16, 1933, Serial No. 689,757
In Germany September 19, 1932

1 Claim. (Cl. 18—12)

My invention relates to the production of webs or films from soft or plastic masses, including for instance celluloid and similar plastic masses, and more particularly to means whereby comparatively thin films of considerable width and great uniformity of dimensions can be manufactured in an easy and efficient manner.

Hitherto, in the manufacture of webs or films from plastic masses such as mentioned above, the product was either obtained by pouring or by cutting from a block or by rolling out the softened or plastic mass. It has also been suggested to extrude the mass through the slotted mouthpiece of a press, but it has been found that with the apparatus hitherto used for the purpose no webs wider than about 300 mms. and of a thickness below 1 mm. could be produced with the usual allowance of ±10% for variations in thickness. This failure is due to the fact that, although the pressure acting on the plastic material may have been equalized with great care and the material guided all over the width of the mouthpiece by the usual distributing segments, the material will still not pass uniformly through the slot, but will travel in an irregular manner, getting wavy during the passage, whereby the thickness of the web differs considerably in transverse direction, thus rendering the web unfit for the majority of uses.

I have found that these drawbacks can be avoided and thin webs or films of great uniformity of thickness throughout and of greater width than hitherto obtainable can be produced, if relative displacement and friction are prevented from occurring between the mass under extrusion and the mouthpiece of the press by associating with the slotted mouthpiece an endless belt defining part of the slot.

In the drawing affixed to this specification and forming part thereof an apparatus embodying my invention is illustrated diagrammatically by way of example.

In the drawing

Figs. 1, 2 and 3 are sections on the lines I—I and II—II in Fig. 3, and an end view, respectively.

Referring to the drawing 24 is the wall of the mouthpiece of the extruding press. 22 are a number of distributing segments arranged in spaced juxtaposition across the mouthpiece 25 and 23 is a distributing grid inserted between the press cylinder 24 and the mouthpiece 25. 16 is an endless belt, made of sheet metal or of some other suitable material, and 17 are cylinders guiding same. The belt 16 extends between the bottom wall 18 of the mouthpiece and an adjustable block 19 in line with the stationary bottom edge of the slot, the top edge of which is formed by an adjustable block 21.

The belt 16 may be moved across the slot by the cylinders 17, which may be driven by any suitable motor (not shown), but the driving action of the mass being extruded through the slot may suffice to carry the belt along. If the cylinders are positively driven at a circumferential velocity superior to the velocity of travel of the web or film, in course of formation, the film will be stretched so as to become thinner.

I have found that if a plastic mass having the suitable consistency is forced under a pressure, which may for instance range between 100 and 200 kgs. per square centimetre, through the slot defined by the bottom edge of block 21 and the surface of the belt 16, it will be formed into a smooth web or film of absolutely uniform thickness, which may even be as low as about 0.2 mm., webs or films more than 1000 mms. in width being produceable in this manner.

I have thus been able to form materials of the nature of celluloid which can be rendered plastic by heating or by the action of solvents, into endless webs, films, plates and the like having a width up to and above 1000 mms. and a uniform thickness throughout down to about 0.2 mms. To this end I have for instance dissolved nitrocellulose and camphor in suitable proportions, or celluloid cuttings, in a suitable solvent of a well known kind in the kneading machine, the kneaded mass being filtered and acted upon further in the usual manner to reduce the contents of solvent to about 20 to 25%. The mass is then filled into the press cylinder and forced across the grid 23 and through the slot 26, moving the belt 16 by the pressure exerted on it or being entrained by the belt if one or all of the cylinders 17 are driven positively by suitable means (not shown).

The degree of viscosity and coherence of the mass may be regulated in a well known manner, for instance by heating or cooling the mouthpiece or parts thereof.

In order to prevent the web or film from sticking to the movable cylinder or endless belt, they are preferably made of metal having a high polish or moistened or otherwise coated with a substance preventing such sticking.

If, instead of a metal belt, a woven or other fibrous band is used, the web or film formed by extrusion will be connected with it so firmly by the pressure exerted on it, that fibrous webs covered with celluloid or the like may thus be obtained in a single operation, which can be put to various uses, for instance as stiffeners for shoe tips etc.

Various changes may be made in the details disclosed in the foregoing specification without departing from the invention or sacrificing the advantages thereof.

I claim:—

Extruding press for producing thin webs, films or plates from plastic masses comprising a slotted mouthpiece and an endless belt associated with said mouthpiece and arranged at and defining the slot of said mouthpiece.

WILLY STELKENS.